May 28, 1935. W. K. ANDREW ET AL 2,002,728
MACHINE TOOL TRANSMISSION AND CONTROL
Filed June 8, 1931 3 Sheets-Sheet 2
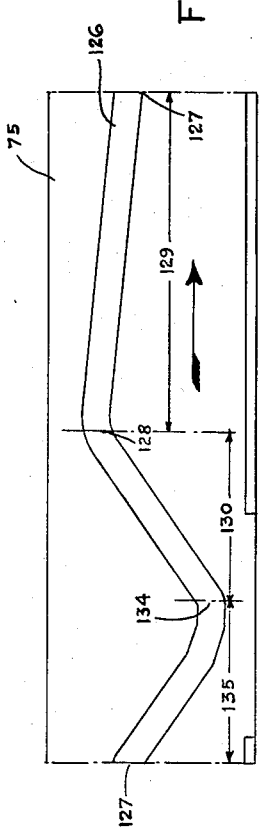
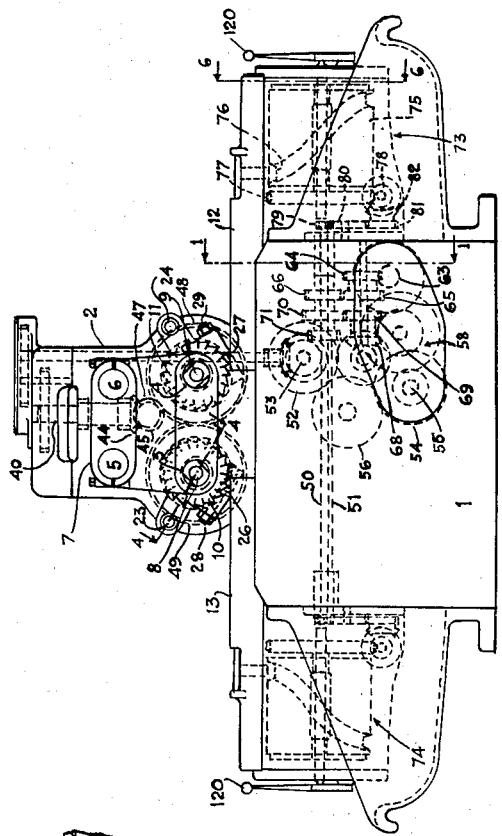
INVENTORS
William K Andrew
BY Joseph B Armitage
Fred G Parsons
ATTORNEY May 28, 1935.  W. K. ANDREW ET AL  2,002,728
MACHINE TOOL TRANSMISSION AND CONTROL
Filed June 8, 1931   3 Sheets-Sheet 3
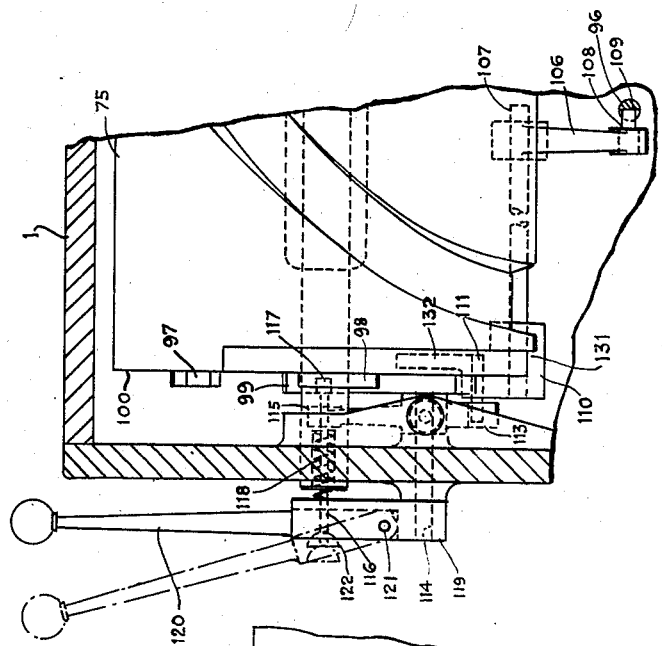
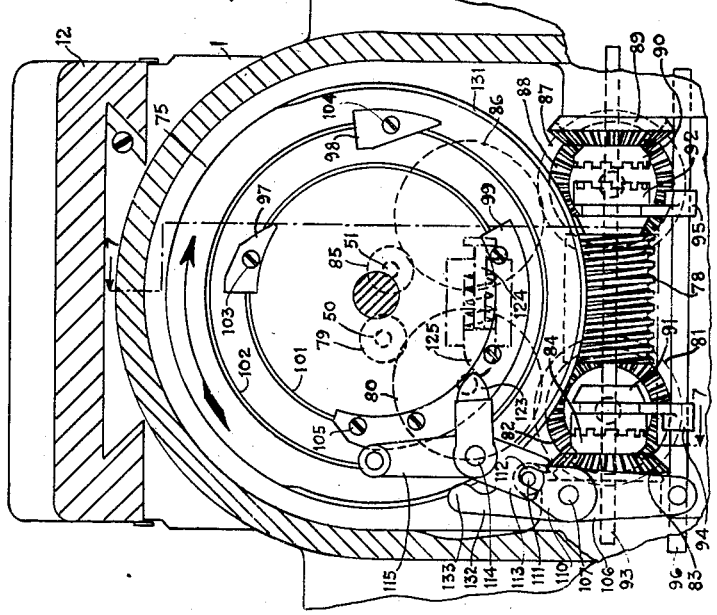
INVENTORS
William K. Andrew
BY Joseph B. Armitage
Fred G. Parsons
ATTORNEY Patented May 28, 1935

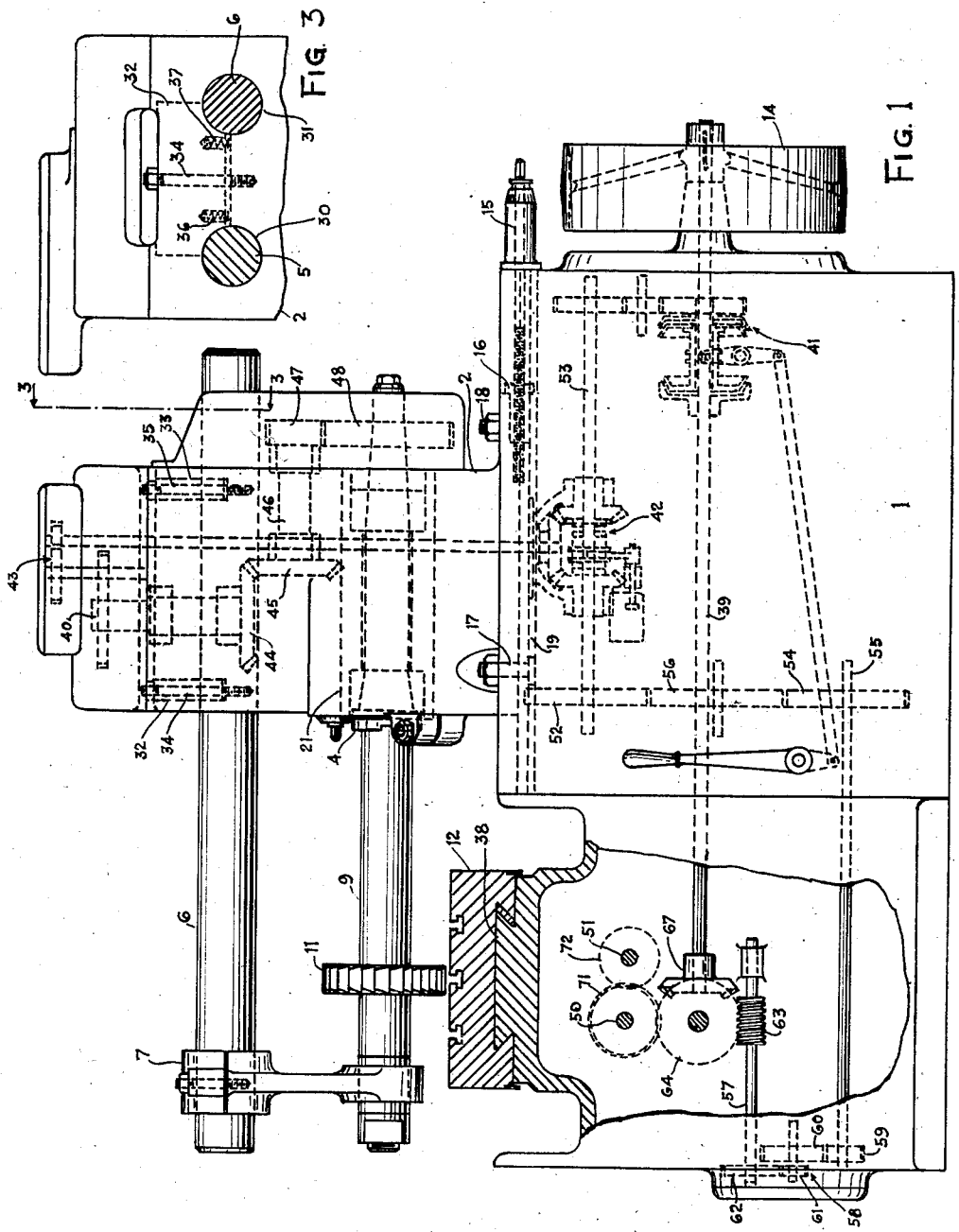

2,002,728

UNITED STATES PATENT OFFICE 2,002,728

MACHINE TOOL TRANSMISSION AND CONTROL

William K. Andrew and Joseph B. Armitage, Wauwatosa, Wis., assignors to Kearney & Trecker Corporation, West Allis, Wis., a corporation of Wisconsin Application June 8, 1931, Serial No. 542,758

6 Claims. (Cl. 90—16)

This invention relates to machine tools and particularly to milling machines.

An object of the invention is to provide a milling machine capable of substantially independent operation upon a plurality of work pieces while combinedly utilizing certain transmission or support portions.

A further object is to provide such a machine having a plurality of reciprocable work tables operable on a single slide together with improved transmission and control mechanism therefor.

Other objects are generally to improve and simplify the construction and operation of milling machines and still other objects will be apparent from the specification.

The invention consists in the construction and combination of parts as herein illustrated, described, and claimed and in such modifications as may be equivalent to the structures claimed.

In the drawings:

Fig. 1 is a right side elevation of a milling machine partly in section along the line 1—1 of Fig. 2 incorporating the invention.

Fig. 2 is a front elevation of the same machine.

Fig. 3 is a section on the line 3—3 of Fig. 1.

Fig. 4 is a section on the line 4—4 of Fig. 2.

Fig. 5 is a development of one of the table operating cams.

Fig. 6 is a section on the line 6—6 of Fig. 2.

Fig. 7 is a section on the line 7—7 of Fig. 6.

Like reference numerals indicate the same parts throughout the specification and drawings.

As shown in Figs. 1 and 2, the machine comprises a base or support 1, supporting a head frame or support 2 slidable on the base and supporting rotatable spindles 3 and 4. Overarms 5 and 6 are slidable in head frame 2 and adapted to support a pendant 7 which provides a bearing for the outer ends of tool arbors 8 and 9 fixed with tool spindles 3 and 4 and carrying cutters 10 and 11. Work support tables 12 and 13 are reciprocably supported on base 1 in position to cooperate with spindles 3 and 4. A pulley 14 constitutes a power source for the machine and is connected to actuate the spindles and tables through mechanism to be described presently. Head frame 2 may be moved on base 1 by means of a screw 15 fixed against axial movement relative to base 1 and engaging a nut portion 16 fixed with head frame 2. Head frame 2 is slidably guided on base 1 and may be clamped in adjusted position by means of bolts such as 17, 18 engaging suitable T-slots such as 19 formed in base 1.

Spindles 3 and 4 are journaled in carriers or quills 20 and 21, Figs. 1 and 4, and fixed against axial movement relative thereto. Carriers 20, 21 are slidable in bores such as 22, Fig. 4, formed in head frame 2 and may each be adjusted in the axial direction of the spindles by means of screws 23 and 24, Figs. 2, 4, each fixed against axial movement and engaging nut portions such as 25, Fig. 4, fixed with the carriers 20 and 21. Slots 26, 27 are formed in head frame 2 intersecting the carrier bores whereby a portion of the bores may be contracted by means of bolts 28, 29 for clamping the carriers in adjusted position.

Overarms 5 and 6 are slidably adjustable in bores 30, 31, Fig. 3, in the head frame and may be clamped in adjusted position by means of clamping members 32, 33 pressed against overarms 5 and 6 by means of bolts 34 and 35 as shown in Fig. 1, the members 32, 33 being raised by springs such as 36, 37, Fig. 3, when bolts 34 and 35 are loosened.

Tables 12 and 13 are supported for reciprocation on a single slide formed on base 1 and generally denoted as 38, Fig. 1, the tables being independently reciprocable at different ends of the slide adjacent the different spindles, but in the same path of longitudinal movement.

Mechanism for driving spindles 3 and 4 from pulley 14 is as follows: Pulley 14 is fixed with a shaft 39, Fig. 1, rotatably supported from bed 1. Shaft 39 may drive a vertical shaft 40 through a clutch device generally denoted by numeral 41, a reverser generally denoted as 42, and a rate changer generally denoted as 43. Vertical shaft 40 is connected to drive each of the spindles through bevel gears 44, 45, shaft 46, and a gear 47 meshing with a gear 48 fixed on one of the spindles and in turn meshing with a gear 49, Fig. 2, fixed on the other spindle. The axial movement of the spindles is relatively slight and is provided for by relative axial movement between gears 47, 48, and 49.

Transmission mechanism for movement of tables 12, 13 from pulley 14 is as follows: A feed rate shaft 50, Figs. 1, 2, 6, and a quick traverse rate shaft 51, Figs. 1, 6, are each extended longitudinally of bed 1 underneath tables 12, 13 and parallel to the reciprocatory movement thereof.

Feed shaft 50 may be driven at any of a variety of feed rates, but only when clutch 41 is engaged to drive the tool spindles, through a feed train including a gear 52 fixed on shaft 53, Figs. 1, 2, and driving a gear 54 fixed on a shaft 55 through an idler 56, a shaft 57 driven from shaft 55 through a rate changer generally denoted as 58, Fig. 1, and which consists of suitably supported removably interchangeable gears 59, 60, 61, 62, the shaft 57 in turn driving the shaft 50 through a worm 63, Figs. 1, 2, a worm wheel 64 meshed therewith, a gear 65 fixed with worm wheel 64, Fig. 2, and a gear 66 fixed with shaft 50 and meshing with gear 65.

Quick traverse shaft 51 is driven from pulley 14 irrespective of the position of clutch 41 through a quick traverse train including a bevel gear 67, Fig. 1, fixed on the extended end of shaft 39 and meshing with a bevel gear 68, Fig. 2, fixed with a gear 69 meshing with a gear 70 fixed with a gear 71 which in turn meshes with a gear 72, Fig. 1, which is fixed on shaft 51.

The shafts 50, 51 drive tables 12, 13 through transmission and control mechanism selective of feed or quick traverse rates. Such mechanism is generally denoted at 73, Fig. 2, for table 12 and as 74, Fig. 2, for table 13. The mechanism 73, 74 is exactly similar, except reversed in relative positions, and will, therefore, be described in detail only for the table 12, as follows: Underneath table 12 is a rotatable cylindrical cam member 75, Fig. 2, having its axis parallel with the path of movement of the table and connected for table movement by the means of a follower member 76 fixed underneath the table and engaging a peripheral cam slot having a developed form as shown in Fig. 5. A worm wheel 77, Fig. 2, fixed with cam 75 engages a worm 78, Figs. 2, 6, which may be driven either from shaft 50, through a train including a gear 79, Figs. 2, 6, fixed on shaft 50, an idler 80, a gear 81, a bevel gear 82 fixed with gear 81, a bevel gear 83 meshing with gear 82 and a terminal feed clutch member 84 fixed with bevel gear 82; or may be driven from shaft 51 through a similar train including a gear 85, Fig. 6, fixed on shaft 51, an idler 86, a gear 87, a bevel gear 88 fixed with gear 87, a bevel gear 89 meshed with gear 88 and a terminal quick traverse clutch member 90. A selection of which of terminal clutch members 84 or 90 shall drive worm 78 may be made by the means of shiftable clutch members 91 and 92, Fig. 6, slidably keyed on shaft 93 on which worm 78 is also keyed, and interconnected for movement by the means of forks 94, 95 engaging suitable annular grooves in the respective members and both fixed on a shiftable rod 96. The arrangement is such that engaging the one clutch member disengages the other.

For controlling the table transmission just described there is provided the following mechanism. Dogs 97, 98, 99, Figs. 6, 7, are adjustably fixed against the end face 100 of cam 75 by the means of T-slots 101 or 102, there being screws 103, 104, 105, etc., engaging suitable elements, not shown, in the T-slots. There is also provided trip mechanism connected with the rod 96 for control thereof as follows: A lever 106, Figs. 6, 7, is fixed on a shaft 107 and a pin 108 fixed with the lever engages a suitable slot 109 in the rod. Also fixed with shaft 107 is a lever 110 carrying a pin 111 having a lost motion engagement with a slot 112 in a lever arm 113 fixed on a shaft 114. Another lever arm 115 fixed with arm 113 carries a plunger 116 slidable to right or left in Fig. 7 whereby a portion or end 117 thereof may be set forward into the path of dogs 97, 98, 99, or withdrawn from such path. Plunger 116 is normally pressed to the right, Fig. 7, for the portion 117 to be in the path of dog movement by the means of a spring 118, but may be manually moved to the left as follows: Shaft 114 carries fixed thereon a lever 119 having a lever handle portion 120 pivoted at 121 in a manner permitting operation against a portion 122 fixed with plunger 116 whereby movement of lever handle 120 to the dotted line position of Fig. 7 withdraws plunger 116 to the left. Handle lever 120 is also operable through lever 119 to manually oscillate the shaft 114. A load and fire or snap-over mechanism of conventional form is associated with shaft 114, consisting of a cam or detent 123 fixed with the shaft 114 and engaged by a spring pressed plunger 124. The arrangement is such that as the trip element or portion 117 is moved to right or left in Fig. 6, the lost motion slot 112 permits the point of cam 123 to move past the point 125 of the plunger before the clutch members 91 or 92, as the case may be, are disengaged from the terminal clutch elements 84 or 90. Thereafter, upon disengagement the cam and plunger will continue the clutch movement into opposite engagement irrespective of the dogs, unless prevented, as later described.

In the position of parts shown in Fig. 6 the table cam 75 is driven from feed terminal element 84 and is therefore travelling at a slow rate. Either terminal element drives the cam 75 in the direction of the arrow, Fig. 6, and in the course of subsequent cam rotation the dog 98 engages the trip portion 117 to move lever arm 115 to the right to disengage clutch member 91, the movement being then completed by the snap-over device to engage the clutch 92 whereby to speed the cam 75 up to a quick traverse rate.

The relationship of the parts is such that at the time of the beginning of the feed movement just described the cam follower 76 is positioned in the cam groove 126, Fig. 5, at approximately the point 127 thereof. During the feed movement just described the cam will have moved in the direction of the arrow, Figs. 5, 6, to position the follower at approximately the point 128 having in the interval traversed the cam groove portion 129 having relatively small rise and operating to move table 12 through the last portion of its movement toward the cutter, that is to say, to the left in Fig. 2.

At the time of the clutch shift, just described, to engage the quick traverse cam movement, the follower 76 is entering that portion of the cam groove shown at 130 which starts table 12 in the other direction or to the right in Fig. 2 at a fast rate, both by reason of the increased speed of cam 75 and also by reason of the increased angle of the cam groove. This rapid cam and table movement continues throughout the right-hand table movement. At the completion of the right-hand movement it is ordinarily desired to stop the table for removal and replacement of work pieces. This is effected by the dog 97, which engages the trip portion 117, forcing lever 115 to the left in Fig. 6, to disengage clutch member 92. In this instance, however, the snap-over mechanism is prevented from immediately engaging the other clutch member as follows:

A portion of the end periphery of cam 75 is cut away as at 131, Figs. 6, 7, over a substantial arc. A lever 132, Figs. 6, 7, fixed with shaft 107 has a portion 133 movable into the space provided by the cut-away portion to permit shaft 107 to move to engage clutch member 91, but prevented from so moving if the cam 75 stands in positions where the cut-away portion does not coincide with the lever portion 132. Such is the cam position when the dog 97 is operative and the snap-over cannot, therefore, engage the feed clutch and the table will stop. When the operator has completed the loading, the table is again started. This is done by pulling hand lever 120 to the left in Fig. 7 whereby to disengage trip element 117 from dog 97, after which the lever is moved to turn shaft 114, Fig. 6, whereby to reengage clutch 92. The cam follower 76 is then at the point 134, Fig. 5, of the cam groove and in the subsequent movement traverses the portion 135 of the cam groove, operating the table 12 to the left, Fig. 2, at a fast rate partly by reason of the fast cam movement and partly by reason of the rapid rise in that portion of the cam groove.

In the next subsequent movement dog 99 is operative. This dog, similar to dog 97, shifts the trip portion 117 to the left in Fig. 6, but in this instance the lever portion 133 is free to move into the cut-away portion 131 of cam 75 whereby the snap-over device shifts clutch member 91 into engagement for a feed rate of cam 75. The cycle of movement previously described is then repeated.

It will be noted that dog 99 is extended over a considerable arc. This is to prevent accidental manual movement of lever 120 in a direction to engage the rapid traverse rate of cam 75 while the cutter is operating on the work piece.

The above is descriptive of the transmission and control mechanism generally denoted as 73, Fig. 2, and the operation thereof for table 12. There is, as previously noted, a similar transmission and control mechanism 74, Fig. 2, for table 13 and the operation thereof is similar in all respects.

Since the control mechanisms of the different tables are completely independent in operation, different operations may be performed by the different tables. Also, one table may be stationary for loading while the other is operating. Various other advantages will also be apparent.

It may be noted that while all the cam portion 129, Fig. 5, may be advantageously used for a feed rate of table movement, it is not necessary to do so. If the quick traverse clutch is engaged to drive cam 75, the resulting rate, even during this portion, is on the order of a rapid traverse. Very short feed movements may therefore readily be effected by suitably positioning the control dogs or providing different dogs similar to those shown.

What is claimed is:

1. In a milling machine, the combination of a first work support table, a support providing a guideway for reciprocatory movement of said table, said guideway having an extended portion, a second work support table guided in said extended portion for reciprocatory movement, a plurality of rotatable tool spindles respectively associated with said first and second work table, and transmission mechanism for movement of said tables including for each table means individually selective of feed or quick traverse rates of table movement, whereby either table may be operated at either rate irrespective of the rate at which the other table is operative.

2. In a milling machine, the combination of a first work support table, a support providing a guideway for reciprocatory movement of said table, said guideway having an extended portion, a second work support table guided in said extended portion for reciprocatory movement, a plurality of rotatable tool spindles respectively associated with said first and second work table, transmission mechanism for rotation of said spindles including shiftable motion interrupting means common to both spindles, and a feed rate transmission mechanism for movement of each of said tables at a cutting rate and driven through said motion interrupting means, whereby each of said tables is inoperative at a feed rate whenever the rotation of said spindles is interrupted.

3. In a milling machine, the combination of an extended table guideway a plurality of work tables respectively reciprocable at opposite ends of said guideway, a plurality of rotatable tool spindles respectively associated with different of said tables, a power source, transmission mechanism for rotation of each of said spindles from said power source, table transmission mechanism for reciprocation of each of said tables from said power source including for each table means associated therewith and individually shiftable to alternatively select feed or rapid traverse rates of movement of the table with which it is associated, and control mechanism for said table transmission including for each table a trip mechanism individual thereto for shifting said shiftable means in accordance with the movement of the table with which it is associated.

4. In a milling machine, the combination of a base, a table guideway supported from said base, a plurality of work tables each reciprocably guided in said guideway and spaced apart in the direction of said reciprocation, transmission mechanism for movement of said tables including a plurality of rotatable elements each supported from said base and respectively underlying the different tables in axial parallelism with said direction of reciprocation, and including a plurality of shiftable devices respectively associated with the different tables and individually determinative of feed or quick traverse rates of the different elements, and control mechanism for said transmission mechanism including a plurality of trip mechanisms respectively associated with the different tables for operation in accordance with movement thereof and each operable for shifting the one of said devices which is associated with the same table, and means for each table individually selective of feed or quick traverse rates of table movement.

5. In a milling machine, the combination of a support, a plurality of work tables each supported from said support for reciprocatory movement in directions toward and from one another, a plurality of rotatable tool spindles respectively associated with the different tables, transmission mechanism for rotation of said spindles, transmission mechanism for said tables including a portion individual to one of said tables, a shiftable device determinative of feed or quick traverse rate of said portion, and a trip device associated with the last mentioned table and operable in accordance with the movement thereof for shifting said shiftable device.

6. In a milling machine, the combination of a support, a plurality of work tables each supported from said support for reciprocatory movement in a direction toward and from the other table, a plurality of rotatable tool spindles respectively associated with different of said tables, transmission mechanism for rotation of said spindles including means for simultaneously interrupting rotation thereof, transmission mechanism for movement of said tables including a rate changer driven through said motion interrupting means, a plurality of feed terminal elements driven from said rate changer and respectively for different of said tables, a quick traverse terminal element driven exclusive of said motion interrupting means and associated with one of said feed elements for individual feed or quick traverse control of one of said tables, and control means for the last mentioned table including a trip device associated therewith and operable through said associated feed and quick traverse elements in accordance with the movement of said last mentioned table.

WILLIAM K. ANDREW.
JOSEPH B. ARMITAGE.